(No Model.)
W. P. JENKINS & J. L. STREETER.
LIVE POULTRY CAR.
No. 304,005.  Patented Aug. 26, 1884.
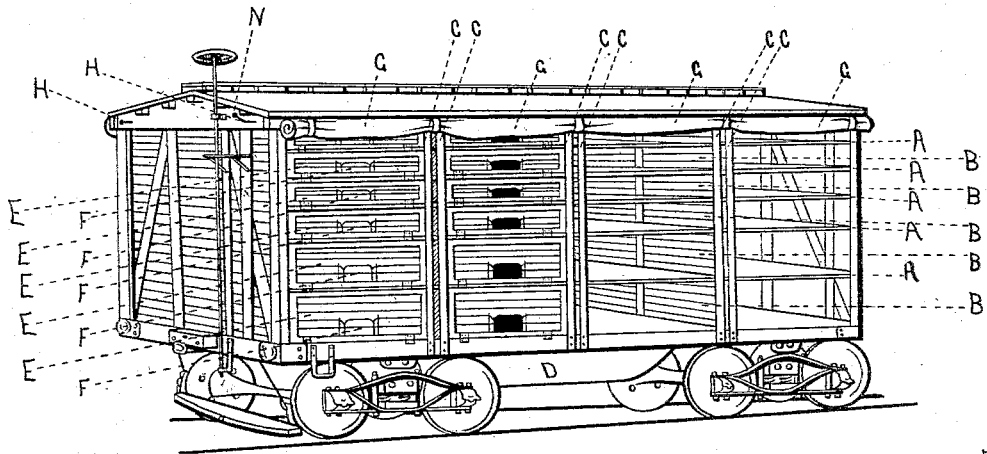
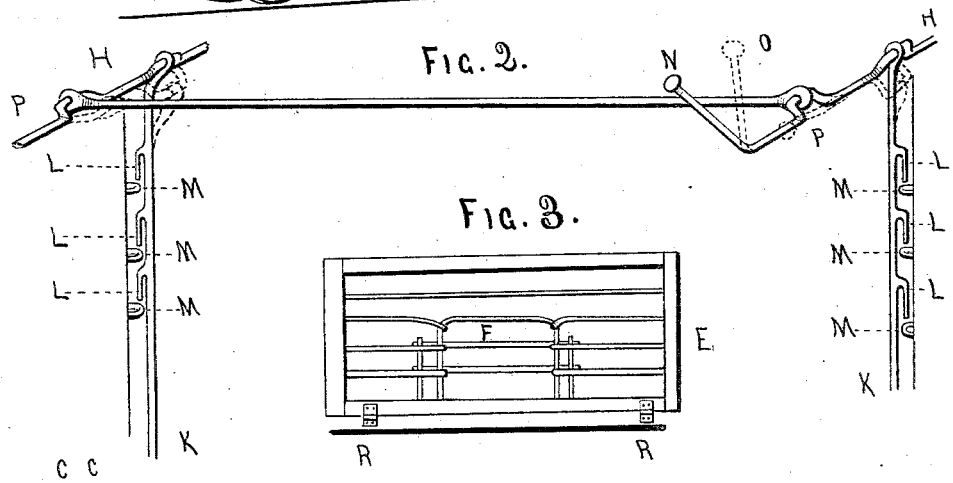
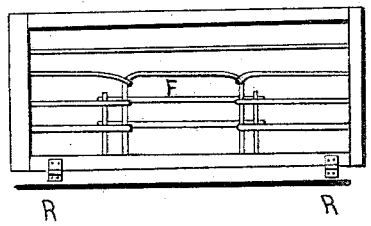
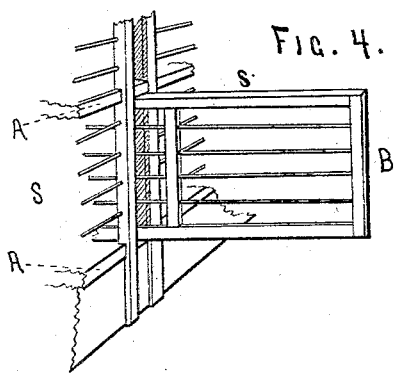
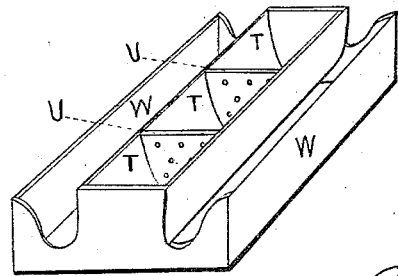
Witnesses:
Asbury L. Kerwood
Walter C. Davis
William P. Jenkins
James L. Streeter
Chas. A. Suffrins Atty in fact.

United States Patent Office.

WILLIAM P. JENKINS AND JAMES L. STREETER, OF MUNCIE, INDIANA.

LIVE-POULTRY CAR.

SPECIFICATION forming part of Letters Patent No. 304,005, dated August 26, 1884.

Application filed May 31, 1884. (No model.)

*To all whom it may concern:*

Be it known that we, WILLIAM P. JENKINS and JAMES L. STREETER, citizens of the United States, and residing in Muncie, in the county of Delaware, and State of Indiana, have invented a new and useful Live-Poultry Car, of which the following is a specification.

Our invention relates to improvements in shipping live poultry, and our object is to utilize space in shipping, avoid overcrowding, and facilitate the classification and care of live poultry in transit by means of a car divided into sections by means of "decks" or floors, subdivided by portable partitions, and supplied with feed-troughs so designed that they will retain food and water for long shipments, combined with facilities for safe keeping and convenience in handling.

Heretofore poultry has been shipped in coops without means of properly feeding and watering them, which, with unloading and loading them, jolted, bruised, and injured them to such an extent as to make them frequently unsalable; and it is to obviate these and other evils that our invention is designed.

Figure 1 is a perspective view of the entire car, representing a section with the doors closed for traveling, a section with the sliding doors, hereinafter described, open and the main doors closed, two sections with the doors off, showing the decks and portable partitions, the lock-rods locking all of the doors, a storm-curtain for bad weather, and a box or receptacle for the portable partitions, feed-troughs, food, &c., beneath the car. Fig. 2 is a perspective view of a lock-rod whereby the doors are locked. Fig. 3 is the compartment-door with sliding door. Fig. 4 is a section of the front of the car with the portable partition, and Fig. 5 is the feed-trough.

Similar letters refer to similar parts throughout the drawings.

The car, Fig. 1, is divided into compartments by decks or floors *a a*, running the length of the car at sufficient distance apart to accommodate standing poultry, which compartments may be subdivided in length by portable partitions B B, introduced between upright pieces C C in the outside frame-work of the car, and which may be carried in the box D when not in use. Each compartment between the aforesaid upright pieces C C is provided with a door, *e*, in turn provided with a sliding door, *f*, to allow the removal at will of individual fowls, or the care of separate compartments while in transit, without unlocking the entire car. A storm-curtain, in sections G G G G, will protect the poultry from inclement weather by unrolling and fastening down. Two rods, H H, connected by a tumbling-rod, extend the length of the interior of the car on both sides, locking and unlocking every main door *e e e*, &c., at once, and itself being locked on the outside with a padlock or other fastening.

Fig. 2 represents a section of the lock-rods H H, a drop-rod, K, opposite each tier of doors and working in a groove in the floor of the car, locking the doors by dropping the catch-pins *h h*, &c., into the staples M M in the doors *e e*. This is operated by turning the crank N, as indicated by the dotted lines O, and locking it in that position with any padlock or other fastening outside the end of the car, the rods E E resting in the holes in the end of the car, which furnish a means of leverage therefor, as indicated by the dotted lines P.

Fig. 3 is the door *e* to the compartments, and is mounted on hinges R R with the sliding door *f*. The slats composing the door may be of any material, and any sliding door may be used.

Fig. 4 shows the manner in which the portable partitions B are inserted between the decks or floors A A, and between the upright pieces C C, dividing the compartments S S, substantially as described.

Fig. 5 refers to the feed and water trough. T T T is the water-trough, divided by perforated partitions U U, which cause the water to pass through slowly, thus preventing the water from splashing out by the careening of the car. W W are the feed-troughs for grain, seed, &c.

We are aware that "double-deck" cars have been used for shipping small stock. We therefore do not claim the multiplication of decks, broadly; but What we do claim as our invention, and desire to secure by Letters Patent, is—

1. The combination, in a railroad-car, of the decks or floors A A, with the portable partitions B B, and the compartment-doors *e e e*, &c., containing the slide-door *f*, substantially as described.

2. The combination, in a railroad-car, of the lock-rods H H, with the drop-rods K K, catch-pins h h, and staples M M in the doors e e, substantially as shown.

3. The combination, in a railroad-car, of the decks or floors A A, the portable partitions B B, and the compartment-doors e e, containing the slide-doors f, with the lock-rods H H, drop-rods K K, catch-pins h h, and staples M M, &c., together with the feed-trough and storm-curtain, as described, and for the purpose specified.

WILLIAM P. JENKINS.
JAMES L. STREETER.

Witnesses:
GEORGE H. KOONS,
WM. H. HICKMAN.